US006986061B1

(12) United States Patent
Kunzinger

(10) Patent No.: US 6,986,061 B1
(45) Date of Patent: Jan. 10, 2006

(54) INTEGRATED SYSTEM FOR NETWORK LAYER SECURITY AND FINE-GRAINED IDENTITY-BASED ACCESS CONTROL

(75) Inventor: Charles A. Kunzinger, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1018 days.

(21) Appl. No.: 09/718,041

(22) Filed: Nov. 20, 2000

(51) Int. Cl.
H04L 9/00 (2006.01)
H04L 9/32 (2006.01)

(52) U.S. Cl. ............ 713/201; 709/225; 713/150; 713/153

(58) Field of Classification Search ........... 709/225; 713/150, 153, 201
See application file for complete search history.

(56) References Cited

U.S. PATENT DOCUMENTS

| | | | |
|---|---|---|---|
| 5,115,466 A | 5/1992 | Presttun | |
| 5,790,548 A | 8/1998 | Sistanizadeh et al. | |
| 5,802,178 A * | 9/1998 | Holden et al. | 713/151 |
| 5,835,726 A | 11/1998 | Shwed et al. | 395/200.59 |
| 5,884,025 A | 3/1999 | Baehr et al. | 395/187 |
| 5,940,591 A * | 8/1999 | Boyle et al. | 713/201 |
| 5,983,350 A | 11/1999 | Minear et al. | 713/201 |
| 6,052,788 A | 4/2000 | Wesinger, Jr. et al. | 713/201 |
| 6,055,236 A | 4/2000 | Nessett et al. | 370/389 |
| 6,055,575 A | 4/2000 | Paulsen et al. | 709/229 |
| 6,067,620 A * | 5/2000 | Holden et al. | 713/155 |
| 6,076,168 A | 6/2000 | Fiveash et al. | 713/201 |
| 6,079,020 A | 6/2000 | Liu | 713/201 |
| 6,304,973 B1 * | 10/2001 | Williams | 713/201 |
| 6,330,562 B1 | 12/2001 | Boden et al. | |
| 6,484,257 B1 | 11/2002 | Ellis | |
| 6,678,827 B1 * | 1/2004 | Rothermel et al. | 713/201 |
| 6,693,878 B1 | 2/2004 | Daruwalla et al. | |

OTHER PUBLICATIONS

Stallings, William; Cryptography and Network Security; 1999; Prentice-Hall, Inc.; 2nd Edition; pp. 399-440.*
IBM Technical Disclosure Bulletin, Vol, 32, No. 9A, Feb. 1990, "Swssion-Based Secure Communication for Secure Xenix", pp. 239-243.
IBM Technical Disclosure Bulletin, vol. 37, No. 02B, Feb. 1994, Security Implementation at Internet Protocol Layer for TCP/I, pp. 683-686.
IBM Technical Disclosure Bulletin, vol. 35, No. 4A, Sep. 1992, "Virtual Private Networks on Vendor Independent Networks", pp. 326-329.

* cited by examiner

Primary Examiner—Gilberto Barron, Jr.
Assistant Examiner—Jung Kim
(74) Attorney, Agent, or Firm—Marcia L. Doubet

(57) ABSTRACT

The present invention provides a method, system, and computer program product for enhancing security within a distributed computing network while enabling fine-grained access control for packets traveling through the network. The disclosed techniques enable this fine-grained access control while simultaneously providing broad-brush application-independent and user-independent security for Internet Protocol (IP) packets that are in transit over both secure networks (such as a corporate intranet) and non-secure networks (such as the public Internet). Access control decisions are delegated to an access control engine, and are based upon mutually authenticated identity information (e.g. of a system user and/or application) that is extracted from information exchanged as part of an underlying security service (such as the Internet Key Exchange of the IP Security Protocol).

33 Claims, 4 Drawing Sheets

INTEGRATED SYSTEM FOR NETWORK LAYER SECURITY AND FINE-GRAINED IDENTITY-BASED ACCESS CONTROL

BACKGROUND OF THE INVENTION

1. Field of the Invention

The present invention relates to a computer system, and deals more particularly with a method, system, and computer program product for providing security within a computer network while enabling fine-grained access control for packets traveling through the network.

2. Description of the Related Art

Cryptography is a security mechanism for protecting information from unintended disclosure by transforming the information into a form that is unreadable to humans, and unreadable to machines that are not specially adapted to reversing the transformation back to the original information content. The cryptographic transformation can be performed on data that is to be transmitted electronically, such as an electronic mail message or an electronic document requested by a user of the Internet, and is equally useful for data that is to be securely stored, such as the account records for customers of a bank or credit company.

The transformation process performed on the original data is referred to as "encryption". The process of reversing the transformation, to restore the original data, is referred to as "decryption". The terms "encipher" and "decipher" are also used to describe these processes, respectively. A mechanism that can both encipher and decipher is referred to as a "cipher".

Use of a "key" during the encryption and decryption processes helps make the cipher more difficult to break. A key is a randomly-generated number factored into operation of the encryption to make the result dependent on the key. The value used for the key in effect "personalizes" the algorithm, so that the same algorithm used on the same input data produces a different output for each different key value. When the value of this key is unknown to unauthorized persons, they will not be able to duplicate or to reverse the encryption.

One of the oldest and most common security systems today is what is known as a "private key" or "symmetric" security system. Private key systems involve two users, both of whom have a shared secret (or private) key for encrypting and decrypting information passed between them over a network. Before communications can occur, the two users must communicate in some secure manner to agree on this private key to ensure the key is known only to the two users. An example of a cipher used for private key security is the Data Encryption Algorithm ("DEA"). This algorithm was developed by scientists of the International Business Machines Corporation ("IBM"), and formed the basis of a United States federal standard known as the Data Encryption Standard ("DES"). Private key systems have a number of drawbacks in an open network environment such as the Internet, however, where users will conduct all communications over the open network environment and do not need or want the added overhead and expense of a separate secure means of exchanging key information before secure network communications occur.

To address the limitations of private key systems, security systems known as "public key", or "asymmetric", systems evolved. In a public key system, a user has a key pair that consists of a private key and a public key, both keys being used to encrypt and decrypt messages. The private key is never to be divulged or used by anyone but the owner. The public key, on the other hand, is available to anyone who needs to use it. As an example of using the key pair for encrypting a message, the originator of a message encrypts the message using the receiver's public key. The receiver then decrypts the message with his private key. The algorithm and the public key used to encrypt a message can be exposed without compromising the security of the encrypted message, as only the holder of the associated private key will be able to successfully decrypt the message. A key pair can also be used to authenticate, or establish the identity of, a message originator. To use a key pair for authentication, the message originator digitally signs the message (or a digest thereof) using his own private key. The receiver decrypts the digital signature using the sender's public key. A common means of publishing a public key to be used for a particular receiver is in an X.509 certificate, also known as a "digital identity".

Public key encryption is generally computationally expensive, having numerous exponentiation operations. It also requires much longer key material than a symmetric key algorithm to provide equivalent security. Hence it is used sparingly, preferably only for cryptographic operations that need its unique properties. Symmetric key encryption is more widely used for bulk data encryption/decryption, because it demands less of the CPU, using primarily repeated shift, rotate, exclusive OR, and table lookup operations.

Public and symmetric key encryption methods are often combined. One example of their combination is the Internet Key Exchange (IKE) protocol of the IP Security Protocol (commonly referred to as "IPSec"). IKE is defined in the Internet Engineering Task Force (IETF) document RFC 2409, "The Internet Key Exchange (IKE)", dated November 1998. IPSec is defined in RFC 2401, "Security Architecture for the Internet Protocol", also dated November 1998.

IPSec provides security services for traffic at the network layer, or IP (Internet Protocol) layer, of a communications network through use of both cryptographic and protocol security mechanisms. IPSec is designed for protecting data in transit across a non-secure network. IPSec makes no distinctions between public networks such as the Internet and private networks such as a corporate intranet, and can be deployed on either type of network. IPSec may operate at either a host (i.e. an endpoint) or at an intermediate security gateway (including routers and firewalls that provide the functionality of IPSec). The security services available in IPSec include data confidentiality (i.e. encryption), data integrity, data origin authentication, and access control. IPSec may be used to protect packets between two hosts, between a host and a security gateway, or between two security gateways.

A tunneling mode is defined in IPSec, wherein the IP content within a packet is protected according to a selected set of security services. Security associations are created for transmitting packets, where a security association ("SA") is a logical 1-directional connection defined for purposes of specifying and enforcing the security services to be used. A security association may be created between two hosts, between two security gateways, or between a host and a security gateway. The SA reflects the security services that have been negotiated for the underlying path. For example, if encryption and authentication are required for some communications between particular entities, but only encryption (and not authentication) is required for other communications between these entities, then two separate security associations will be created. The set of security services applicable to an SA are also referred to as a "security policy".

Tunneled packets in IPSec have an outer IP header whose source and destination addresses identify the endpoints of the tunnel, and an inner IP header whose source and destination addresses identify the originator and recipient of the packet. When IPSec is used in "tunnel" mode, the complete inner packet, which is comprised of both the inner header and the payload, is protected as the packet travels through the tunnel. However, the outer header remains in clear text form as the packet travels through the tunnel. The protection applied to the complete inner packet can be encryption alone, authentication alone, or both encryption and authentication, as specified by the relevant security association negotiated between the tunnel endpoints.

IKE may be used to securely negotiate security associations between the two endpoints of an IPSec tunnel, and to exchange authenticated material from which each endpoint can derive the symmetric keys that will be used for protecting data transmitted on that tunnel. The IKE message exchange comprises two phases. In the first phase, a negotiation is performed, and a secure authenticated control channel (an IKE SA) is established using negotiated attributes (including an encryption algorithm, hashing algorithm, and authentication method). In the second phase, an SA is negotiated on behalf of a security service such as IPSec to establish a secure "traffic" channel for exchanging packets between a pair of communicating end systems.

The steps in a typical phase 1 are: (1) offer and acceptance of the attributes of the IKE SA, which will protect the subsequent IKE negotiation messages; (2) an unauthenticated Diffie-Hellman exchange of keying material that will subsequently be used to derive symmetric encryption and authentication keys for protecting both the IKE messages (i.e. the control flows) and user traffic; and (3) a mutual authentication step that allows each party to authenticate itself to the other using strong cryptographic techniques (thereby ensuring the authenticity of the Diffie-Hellman keying exchange). The phase 2 exchange is then performed to negotiate the IPSec SA, which will be used subsequently to protect user traffic. Furthermore, the packets of the user traffic will be tightly bound to the authenticated identities of the two entities that completed the successful IKE phase 1 negotiation.

However, the prior art does not teach techniques for providing access control that is based on the identities of the communicating entities. IPSec provides an authentication technique, as stated above, but this technique is limited in function and results in access controls that are typically coarse-grained in nature. Application of the authentication process begins with determining an applicable security policy. One or more security policies can be defined in IPSec, and stored in a security policy database (SPD). Incoming packets are then compared to the stored security policy information. If a match is found (i.e. the policy to be applied to the packet can be determined), then the attributes of an SA associated with that policy are used to locate a suitable existing SA or to create a new SA having the required attributes. In this manner, the policy also determines whether the packet will be further processed by IPSec (such as performing encryption and/or authentication on the packet content), or whether the packet is to be forwarded without further IPSec processing, or simply discarded. The IPSec standard states that an administrative interface must be provided to enable specification of the attributes of traffic that will use a particular SA, including the source and destination addresses of data packets. Because of the burden that will be placed on an administrator if detailed information is to be provided (which would enable a finer-grained access control), an SA will tend to have relatively non-specific information (including use of wildcards or address ranges for the source and destination address information), thereby providing coarse-grained access control. That is, a security policy may specify that all packets from IP addresses in the range of 1.2.3.4 to 1.2.3.255 are to use an SA that provides encryption using a particular encryption algorithm. It would be preferable to provide much finer access control granularity, based on (for example) the identity of users of the communicating entities, without placing a burden on an administrator to state massive amounts of detailed information and without adding complex access control processing logic to an IPSec implementation.

U.S. Pat. No. 6,076,168, entitled "Simplified Method of Configuring Internet Protocol Security Tunnels", teaches a technique for configuring and maintaining security tunnels and packet filters that steer user traffic into or out of those tunnels. However, this patent does not teach a technique for making access control decisions at a fine level of granularity without overburdening a secure transport mechanism. U.S. Pat. No. 5,940,591, entitled "Apparatus and Method for Providing Network Security", uses logic that is positioned in the upper layers of a communication stack for providing improved network security, and does not allow participation of the end systems in the process. U.S. Pat. No. 6,052,788, entitled "Firewall Providing Enhanced Network Security and User Transparency", deals with the use of the Domain Name Service (DNS) and application gateways in a firewall. The methods taught therein are address-based, and do not address user identification nor cryptographic authentication. U.S. Pat. No. 5,835,726, entitled "System for Securing the Flow of and Selectively Modifying Packets in a Computer Network", teaches techniques for inspecting packets but does not discuss ascertaining the identity of the data originator, nor making access control decisions with a fine level of granularity.

Accordingly, what is needed is an improved technique for securely making access control decisions without overburdening system administrators and without adding to the complexity of existing security services such as IPSec.

SUMMARY OF THE INVENTION

An object of the present invention is to provide an improved technique for securely making access control decisions in a complex distributed networking environment.

Another object of the present invention is to provide this technique in a manner that does not overburden system administrators and does not add to the complexity of existing security services such as IPSec.

Yet another object of the present invention is to provide a secure, fine-grained access control technique that is based on an authenticated identity of a system user.

Still another object of the present invention is to provide this technique by securely delegating access decisions to an access control engine that is designed for this purpose.

A further object of the present invention is to provide a technique for efficiently associating data packets with an authenticated user, and making access control decisions based on previously-stored privileges or credentials of that authenticated user.

Another object of the present invention is to provide this access control technique in a manner that enables segregating access control information from security policy information, such that changes to one do not require corresponding changes to the other.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for providing fine-grained identity-based access control. In a first aspect, this technique comprises: establishing a first security association between a first host and a boundary device, wherein the first security association uses strong cryptographic techniques; establishing a second security association between a second host and the boundary device, wherein the second security association uses strong cryptographic techniques; providing secure communications between a security enforcement function in the boundary device and an access control function; extracting, by the security enforcement function, a first authenticated identity associated with the first host during establishment of the first security association; extracting, by the security enforcement function, a second authenticated identity associated with the second host during establishment of the second security association; providing the extracted first authenticated identity and the extracted second authenticated identity, by the security enforcement function, to the access control function; and determining access privileges of the first host and the second host, by the access control function, based upon the provided extracted identities.

The strong cryptographic techniques used for the first security association and the second security association are preferably provided by IKE and IPSec. The technique may further comprise securely making the determined access privileges available to the security enforcement function, and using the made-available access privileges to determine whether to forward a packet flowing between the first host and the second host or to discard the packet. Or, the technique may further comprise securely communicating packet-handling directives from the access control function to the security enforcement function, based upon the determined access privileges, and using the communicated packet-handling directives to determine whether to forward a packet flowing between the first host and the second host or to discard the packet.

Providing the secure communications may further comprise establishing a secure channel between the security enforcement function and the access control function. The first and second security associations may specify only coarse-grained access control information. The first authenticated identity associated with the first host may be an identification of a user of the first host and/or an application executing on the first host. Similarly, the second authenticated identity associated with the second host may be an identification of a user of the second host and/or an application executing on the second host.

In another aspect, the security enforcement function is not located in the boundary device, but instead operates partly in the first host and partly in the second host. In this case, providing the secure communications between the security enforcement function and the access control function preferably further comprises establishing secure channels between the security enforcement functions and the access control function.

In yet another aspect, the technique comprises: establishing a first security association between a first host and a first boundary device using strong cryptographic techniques; establishing a second security association between a second host and a second boundary device using strong cryptographic techniques; providing secure communications between a first security enforcement function and an access control function; providing secure communications between a second security enforcement function and the access control function; extracting, by the first security enforcement function, a first authenticated identity associated with the first host during establishment of the first security association; extracting, by the second security enforcement function, a second authenticated identity associated with the second host during establishment of the second security association; providing the extracted first authenticated identity and the extracted second authenticated identity, by the first and second security enforcement functions, to the access control function; and determining access privileges of the first host and the second host, by the access control function, based upon the provided extracted identities. In this aspect, the strong cryptographic techniques are also preferably provided by IKE and IPSec. The technique may further comprise securely making the determined access privileges available to the security enforcement function, and using the made-available access privileges to determine whether to forward a packet flowing between the first host and the second host or to discard the packet. Or, the technique may further comprise securely communicating packet-handling directives from the access control function to the security enforcement function, based upon securely the determined access privileges, and using the communicated packet-handling directives to determine whether to forward a packet flowing between the first host and the second host or to discard the packet.

The first and second security enforcement functions may be co-located and operate in the boundary device. In this case, providing the secure communications preferably further comprises establishing a secure channel between the co-located security enforcement function and the access control function. Alternatively, the first security enforcement function may operate in the first host while the second security enforcement function operates in the second host. In this case, providing secure communications between the first security enforcement function and the access control function preferably further comprises establishing a first secure channel between the first security enforcement function and the access control function, and providing secure communications between the second security enforcement function and the access control function preferably further comprises establishing a second secure channel between the second security enforcement function and the access control function.

In a further aspect, the technique comprises: establishing a mutually-authenticated connection between a first device and a second device using strong cryptographic techniques; extracting a first authenticated identity associated with the first device and a second authenticated identity associated with the second host during establishment of the mutually-authenticated connection; providing secure communications between a security enforcement function and an access control function; providing the extracted first and second authenticated identities, by the security enforcement function, to the access control function; determining access privileges of the first device and the second device, by the access control function, based upon the provided extracted identities; and securely communicating packet-handling directives from the access control function to the security enforcement function, based upon the determined access privileges.

The present invention will now be described with reference to the following drawings, in which like reference numbers denote the same element throughout.

DESCRIPTION OF THE PREFERRED EMBODIMENT

Figure 1:
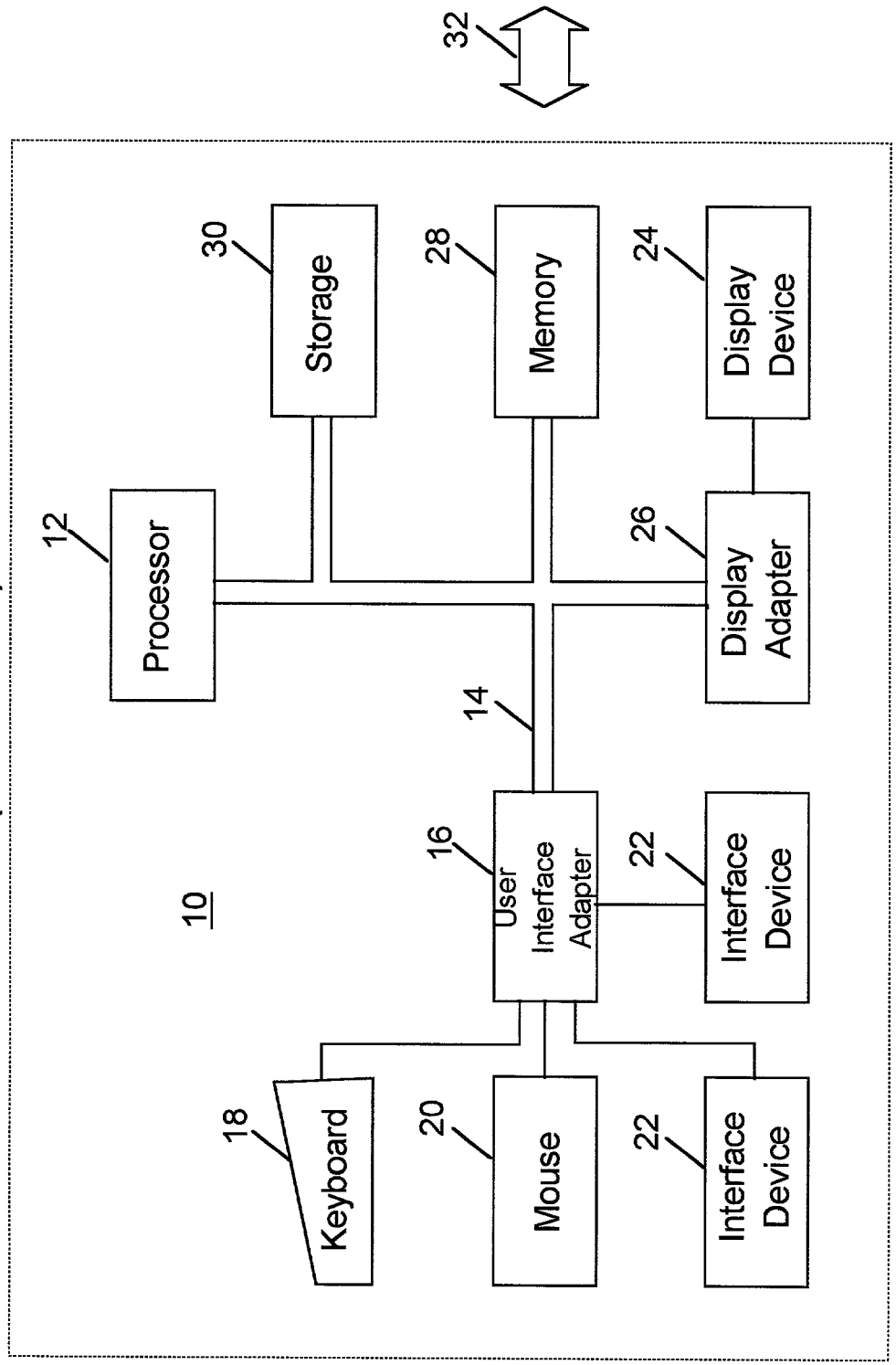
FIG. 1 is a block diagram of a computer environment in which the present invention may be practiced.

FIG. 1 illustrates a representative environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Functions of the present invention typically operate in machines such as gateways (including firewalls and routers). The architecture and components of such machines is similar to that depicted in FIG. 1 (except that the user interface elements are sometimes omitted). The differences between the components of gateways, as contrasted to workstation machines, are well known and will not be described in detail herein.

Figure 2:
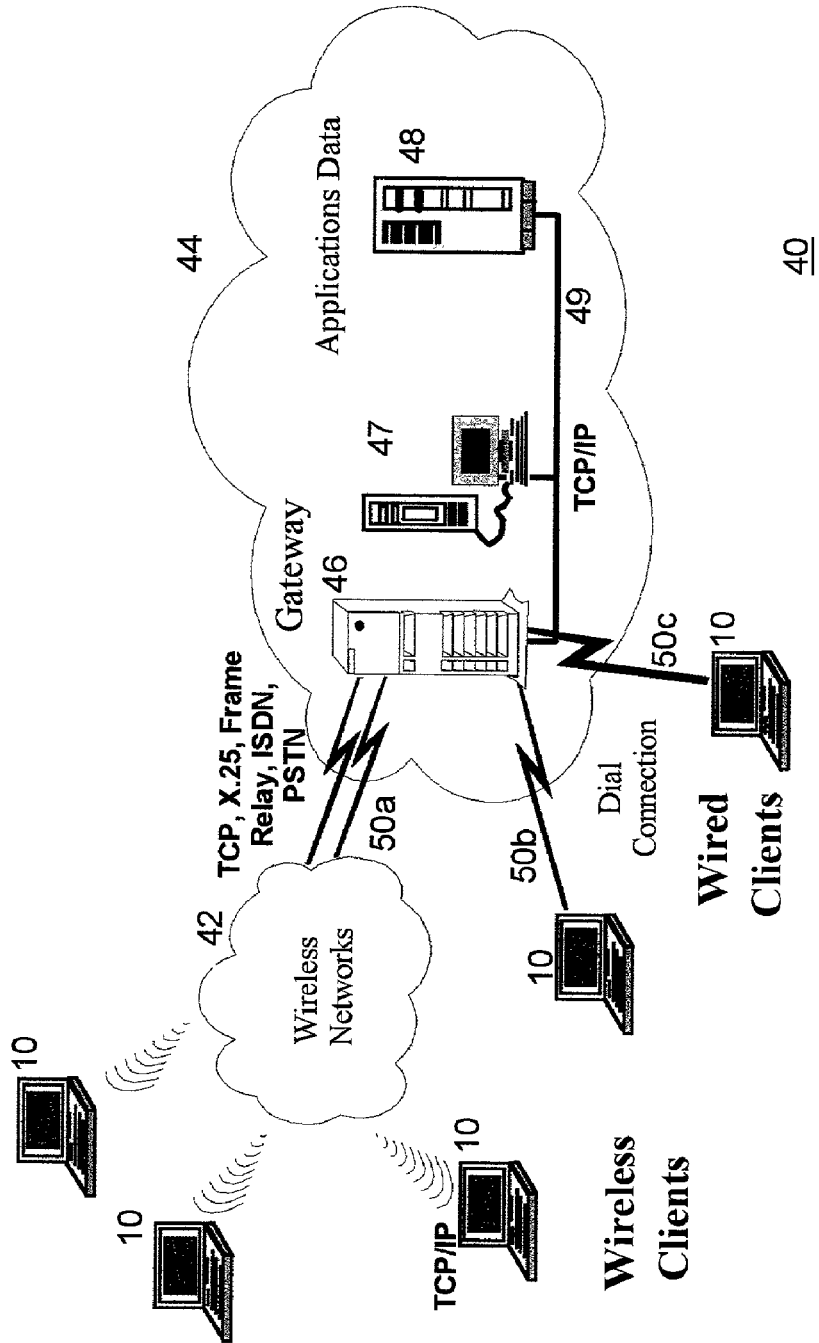
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation (IBM), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 (e.g. of workstation 10, server 47, and/or an intermediary such as gateway 46) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing (and communication) capabilities. The remote server and the gateway machines, similarly, can be one of any number of different types of computer which have processing and communication capabilities. These techniques are well known in the art, and the hardware devices and software which ale their use are readily available. Hereinafter, the user's computer will be referred to equivalently as a "workstation" or "client", and use of any of these terms or the term "server" or "gateway" refers to any of the types of computing devices described above.

In the preferred embodiment, the present invention is implemented as one or more computer software programs. The software typically operates on an intermediary (i.e. a gateway, firewall, or router) in a network, as one or more modules (also referred to as code subroutines, or "objects" in object-oriented programming). The server or intermediary may be providing services in an Internet environment, in a corporate intranet or extranet, or in any other networking environment. Alternatively, functions of the present invention may be implemented in hardware, or in a combination of hardware and software.

The present invention defines a novel technique for providing fine-grained access control in a distributed network computing environment. An authenticated identity of a user is passed to an access control engine (which may be referred to equivalently as an authorization engine). This authenticated identity is used to locate the user's privileges or credentials, and thereby determine how data from/to this user should be handled in a security-sensitive networking environment.

The manner in which a preferred embodiment of the present invention operates will now be described with reference to FIGS. 3 and 4.

The present invention takes advantage of the cryptographically strong authentication provided by IKE in combination with IPSec. (Note, however, that references to IPSec and IKE are for purposes of illustration and not of limitation: alternatively, the present invention may be used in environments wherein security services providing analogous functionality are used.) The prior art IKE message exchanges authenticate the two entities that are negotiating an IKE SA. The present invention then uses the result of this authentication process as input to the services of an access control engine, thereby achieving fine-grained access control based upon (for example) the identity of the originating user or destination user for a particular packet, and/or the application in which the packet is used. The disclosed techniques enable this fine-grained access control while simultaneously providing broad-brush application-independent and user-independent security for IP packets that are in transit over both secure networks (such as a corporate intranet) and non-secure networks (such as the public Internet).

Figure 3:
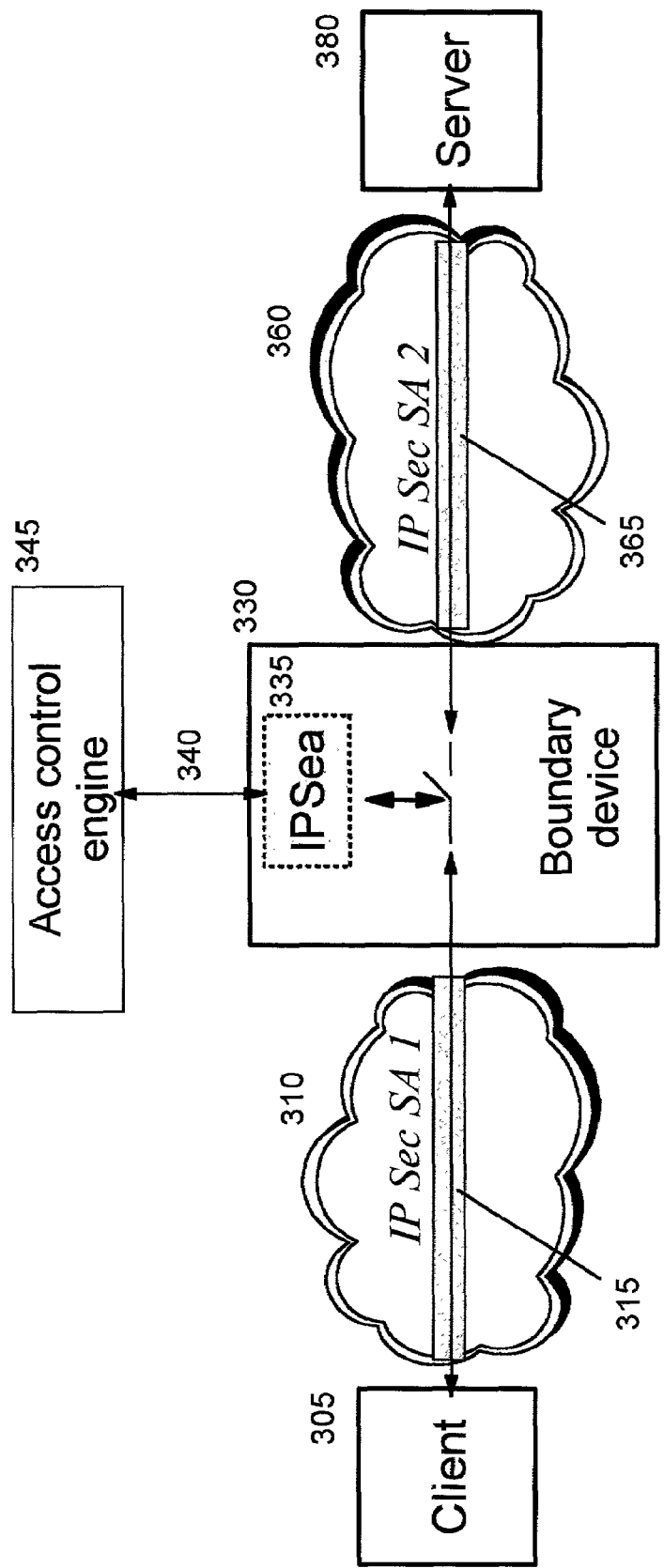
FIG. 3 illustrates the components of a simple configuration in which a preferred embodiment of the present invention may operate.

Referring now to FIG. 3, the basic components involved in a simple network configuration in which the present invention may be used will be described. A boundary device 330 is located between (1) a secure network 310 accessible to a client 305 and (2) a non-secure network 360 through which a server 380 can be reached. The boundary device 330 may be a general-purpose security gateway, firewall, router, etc., in which the function of the present invention is operating, or a special-purpose device adapted to use with the present invention. An IPSec Enforcement Agent (hereinafter, "IPSea") function 335 resides in device 330. This IPSea 335 provides a termination point for two independent tunnel-mode IPSec security associations 315 and 365: one between the device itself and client 305, and the other between the device and the server 380. In preferred embodiments of the present invention, conventional IKE and IPSec functionality operates within boundary device 330. (This functionality is logically integrated with the functionality of IPSea 335, as will be described in more detail herein. Whether the IPSea function is identifiably separate from these conventional security services is not material to the architecture of the present invention, and thus the separation of IPSea 335 is for purposes of illustration and not of limitation.)

According to the present invention, a secure communications channel 340 is established from the IPSea function 335 to a logically separate access control engine 345. (Typically, the access control engine will be in a separate physical device, although it may also be incorporated within the same device as the IPSea functions. Both embodiments are within the scope of the present invention.) An example of the type of access control engine with which the present invention may be used is the Tivoli® SecureWay® Policy Director product, available from Tivoli Systems. Inc. ("Tivoli" is a registered trademark of Tivoli Systems, Inc., and "SecureWay" is a registered trademark of IBM.)

The access control engine 345 makes access control decisions based on information furnished to it by IPSea 335 across the secure channel 340. In preferred embodiments of the present invention, the furnished information comprises identity information that has been authenticated using strong cryptographic techniques during the IKE message exchanges, thereby minimizing the amount of system overhead generated through use of the present invention while improving the security, reliability, and efficiency of the authorization process. The access control engine 345 then consults its previously-stored privileges and/or credentials which match this identity, and sends packet-handling directives to instruct the IPSea 335 as to how to proceed with the current packet. This decision will be one of: (1) prevent the packet from flowing through the IPSea 335; or (2) permit the packet to flow through IPSea 335 along the path to its destination. (Alternatively, the access control engine 345 may forward access information to the IPSea 335 to enable the IPSea 335 to make the determination as to whether or not the packet should be forwarded.)

In practical deployments of the present invention, there will also typically be some sort of conventional (non-cryptographic) firewall functions (such as packet filtering) performed at the boundaries of the networks 310 and/or 360 (perhaps in device 330). However, such elements play no essential role in the architecture of the present invention, and thus are not shown in the diagram of FIG. 3 nor discussed in subsequent descriptions.

For purposes of the architecture of the present invention, no classification of networks (or network clouds, as appropriate) 310 and 360 as being "secure" or "non-secure", or "trusted" or "non-trusted", is assumed. Instead, all networks and network clouds are potential candidate regions in which packets can be protected while in transit using the IKE and IPSec protocol suites.

To enable end-to-end protection of packets, conventional tunneling capabilities (such as VPN, or Virtual Private Network, tunneling functions) are preferably provided in client 305, server 380, and boundary device 330. In one embodiment of the present invention, the secure linkage 340 between the IKE protocol information available in IPSea function 335 and the access control engine 345 is provided only from device 330. In alternative embodiments, similar secure links may be provided from IKE functionality in end devices 305 and 380 to the access control engine 345, although this has not been illustrated in FIG. 3. In these alternative embodiments, a sending end device may thereby predetermine the privileges of a destination end device, and similarly, a receiving end device may verify the credentials of an originating end device. This information may then be used according to the needs of particular applications in use by the end devices.

For illustrative purposes, suppose client 305 wishes to communicate securely with server 380, and that a secure network segment 310 and a non-secure network segment 365 are located between these entities and are connected through boundary device 330. Experience has shown that traffic transported through a corporate intranet is subject to security compromises similar to those that may occur in a public Internet, and thus the ability to tailor the protection afforded to a packet as it travels through different network segments while still being able to perform fine-grained access control at boundary device 330 will yield significant advantages in establishing secure end-to-end VPNs (whether within a single enterprise, or between separate enterprises). The present invention enables this enhanced functionality, and packets sent by client 305 to server 380 are therefore secured while in transit on either network segment 315 (between client 305 and boundary device 330) or 365 (between device 330 and server 380).

The information flow with which the secure, strongly-authenticated and authorization-verified packet transmission occurs will now be described. First, client 305 undertakes a conventional IKE negotiation with the IPSea function 335 in boundary device 330. This comprises, for example, negotiation of an encryption key to protect the IKE messages, and then an exchange of digital certificates inline during the IKE negotiation process. At the completion of the IKE phase 1 message exchange, the client 305 and boundary device 330 have mutually authenticated themselves to one another using strong cryptographic techniques, as stated earlier. The IPSea 335 extracts the authenticated identity of its peer from the relevant fields of the IKE phase 1 messages, for subsequent use by the functions of the present invention. Next, IPSea 335 continues with normal IKE phase 2 negotiations, establishing an IPSec security association on the network segment 310 between itself and client 305. According to conventional IPSec techniques, this IPSec SA and all subsequent packets flowing on it are tightly bound to the identity that has been extracted from the phase 1 messages. Note that this IPSec SA can be defined, when the present invention is used, at a very coarse level (such as "all protocols, all ports"), because the more granular access control decisions are no longer bound to the IPSec SA but instead are delegated (through IPSea 335) to access control engine 345.

A similar IKE negotiation process may occur between boundary device 330 and server 380, resulting in establishment of another IPSec SA on the network segment 365 between these entities. Alternatively, a previously-existing IPSec SA may be used, provided that an IPSec SA with the required attributes has been created. As stated with reference to the first IPSec SA, the attributes can now be much more coarse grained. This, in turn, leads to a much greater potential for re-use of existing IPSec security associations, and corresponding reductions in system overhead and transmission delays.

Upon successful completion of the two independent IKE negotiations, the IPSea 335 is in possession of (1) an authenticated identity for the client and (2) an authenticated identity for the server. This authenticated identity information may comprise an identity of a user of the corresponding device, and/or an identity of an application for which the secure tunnels are being created.

Now, when packets are sent from client 305 to server 380, IPSea 335 is able to associate them with an authenticated identity (i.e. the identity retrieved from the IKE messages of IKE phase 1), since the IKE and IPSec protocols inherently provide a binding between an individual IPSec-protected packet and the identities of the IKE negotiators. Upon receiving a packet over one of the secure tunnels, the IPSea forwards this authenticated identity information over secure channel 340 to the access control engine 345. Additional information from the packet may be forwarded as well, if desired, to enable access control engine 345 to make more precise and accurate decisions. For example, if packet content is available in cleartext form within boundary device 330, it may be possible to determine information such as which protocols are in use, which ports are in use, and so forth for this particular instance of communication. Using the forwarded information, access control engine 345 consults its authorization information (which may be stored, for example, in a database adapted for use with the Lightweight Directory Access Protocol, or "LDAP"). Based on its available authorization information, access control engine 345 preferably returns a "permit" or "deny" decision over secure channel 340 to the IPSea 335. (As stated above, the permit or deny decision may alternatively be made by the IPSea 335 after receiving information from the access control engine 345 on the secure channel 340.) The decision to discard a particular packet may be made because (for example) this user is not permitted to transmit or receive, as appropriate, this packet; because this user has exceeded some threshold which counts messages exchanged for a particular application; and so forth. IPSea 335 then forwards or discards the packet accordingly, based on the directive it has received.

Note that in the above example the IPSea 335 can be thought of as a trusted third party—that is, both the client and the server trust the IPSea. The concepts and message flows which have been described can be easily extended to more complex configurations wherein more than one trusted third party entity is present in the network path between the client and server. An example of such a configuration is illustrated in FIG. 4. In this example, 3 network clouds 410, 460, 480 and 2 boundary devices 420, 470 exist. Each boundary device has a secure access channel 430, 440 to an access control engine 435. In a preferred embodiment, the access control engine 435 and its authorization database are commonly accessible to both boundary devices 420, 470, thereby providing consistent end-to-end authorization and access control decisions throughout the VPN. (In alternative embodiments, more than one access control engine may be accessed by components of a single VPN, although this has not been illustrated in FIG. 4.)

An IPSea function (shown as elements 425 and 475) is implemented in each boundary device 420, 470. Conventional IKE and IPSec functionality is implemented in each end system 405, 490, and is used to establish security associations and secure tunnels with the appropriate boundary device. In this example configuration, three separate and independent instances of IKE message exchange are used to establish three secure VPN tunnels and corresponding IPSec security associations 415, 465, 485 over segments of the network. As each packet travels from Host A 405 to Host B 490, it is securely protected while traveling within all network clouds 410, 460, 480 in its path. Furthermore, the mutual authentication of each host to its nearest boundary device (performed with IKE message exchanges of the prior art) provides identity information that is extracted by the IPSea function in the boundary device. This authenticated identity information may be provided to the access control engine to verify that each packet is authorized to travel over the VPN tunnel of each network segment, providing much more efficient and accurate access control than is available using prior art techniques.

Figure 4:
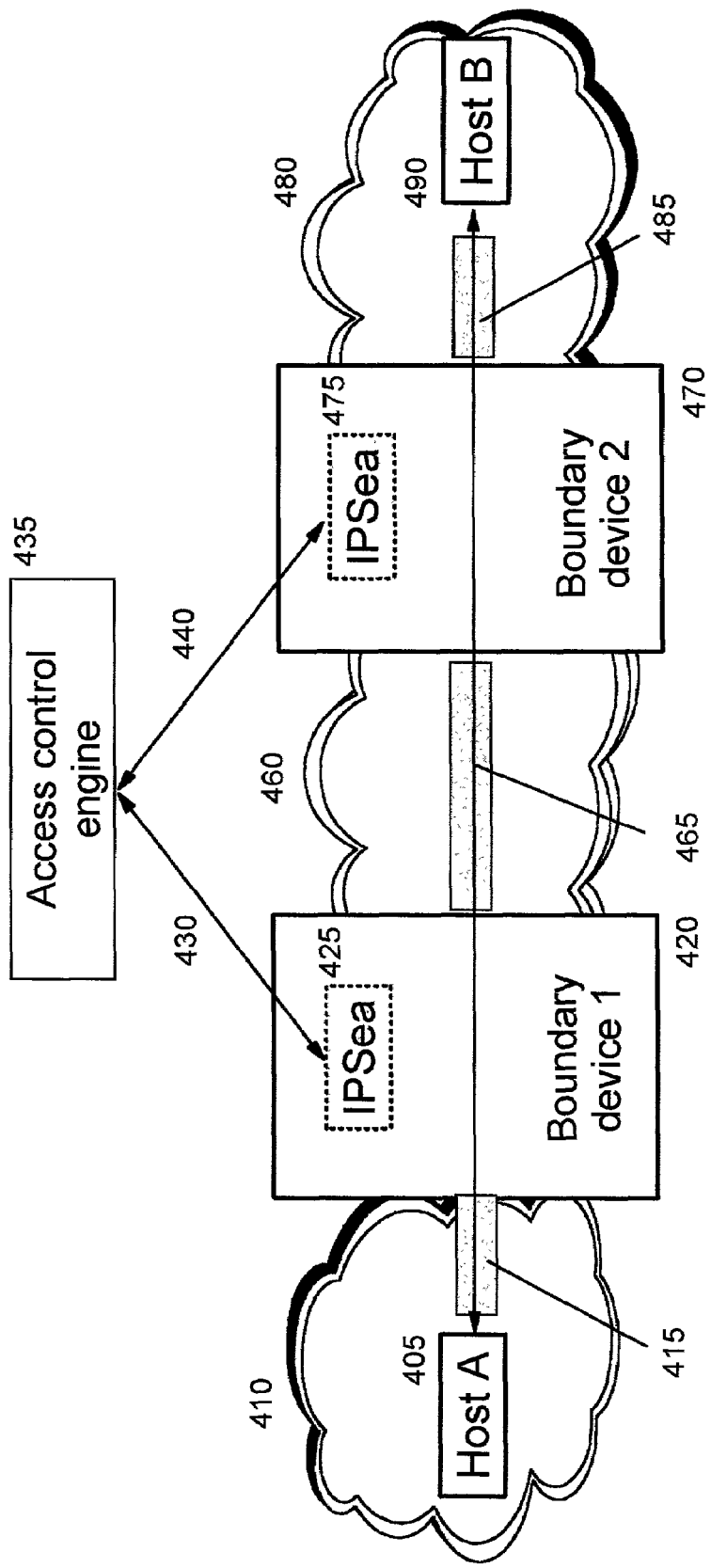
FIG. 4 illustrates an example of another configuration in which the present invention may operate.

A trust model that applies to the configuration shown in FIG. 4 has the following requirements:

(1) Each IPSea function 425, 475 trusts the access control engine 435, and queries it for authorization decisions.
(2) IPSea function 425 and Host A 405 have mutually authenticated themselves to each other using strong authentication such as that provided by IKE.
(3) IPSea function 475 and Host B 490 have also mutually authenticated themselves to each other using strong authentication.
(4) IPSea function 425 and IPSea function 475 have mutually authenticated themselves to each other using strong authentication.
(5) IPSea function 425 and IPSea function 475 each have a secure communications channel to the access control engine 435.

When it wants to talk with Host B 490, Host A 405 places packets into tunnel 415 according to standard IKE and IPSec protocols. Having established Host A's identity, and having potentially examined the packets flowing between Host A and Host B, IPSea 425 can present Host A's credentials to access control engine 435 to ascertain (inter alia) whether Host A is permitted to talk to Host B. If so, then IPSea 425 will pass the packets into tunnel 465, where they will be forwarded to IPSea 475.

IPSea 475 receives the packets coming out of tunnel 465. Having authenticated Host B, and having potentially examined the content of a de-tunneled packet, IPSea 475 can ask access control engine 435 if the packet can continue on its way to Host B. If so, IPSea 475 places the packet into tunnel 485.

In this example configuration, the end-to-end authorization decision provided by the present invention is made in two parts, each executed by one of the two "mutually-trusting" boundary devices. In the first part, IPSea 425 receives a forwarding decision based upon Host A's credentials (because, in the preferred embodiments, IPSea 425 supplies the authenticated identity of Host A only). In the second part, IPSea 475 receives a forwarding decision based upon Host B's credentials. But because IPSea 425 and IPSea 475 trust each other not to maliciously change the packet content, because the security association 465 provides cryptographically robust integrity checking and data origin authentication on the information exchanged between IPSea 475 and IPSea 425, and because they query a common access control engine having a consistent authorization database, an informed decision can be made as to whether the end-to-end connection from Host A to Host B should be permitted. In effect, IPSea 425 says "I will let the packet continue to flow, relying on IPSea 475 to authenticate the packet's destination host" and IPSea 475 says "will let the packet continue on its way to its destination host, because I trust IPSea 425 to have authenticated the origination host and to not have tampered with the packet content".

Note that each boundary device is required to support two secure tunnels when using the present invention. Furthermore, each end system is required to implement the IPSec and IKE protocol suites (or other suites providing analogous functionality), so that the end system can authenticate itself to its adjacent boundary device.

The centralize access control techniques of the present invention provide a solution that scales very efficiently. If some number of hosts "n" in one network cloud wanted to communicate pairwise with some number of hosts "m" in another network cloud, a conventional IPSec solution would mandate the establishment of (m*n) pairs of unidirectional IPSec security associations, one for each pair of communicating hosts. When the present invention is used, however, only (n+m+1) pairs of unidirectional IPSec security associations are required ("n" to connect each host in the first cloud to a local boundary device, "m" to connect each host in the second cloud to another local boundary device, and 1 to connect the two boundary devices).

Note also that the IPSec security associations that may be used with the present invention may be "broad brush", generic security associations (e.g. for an SA that communicates between a particular end system and a particular boundary device, or between two boundary devices), where these security associations are not constrained by factors such as the application (or protocol or port) that creates and receives the packets to be transmitted. This provides a significant reduction in the number of security associations that need to be supported, and a corresponding simplification in the management of a VPN. Establishment of each SA entails several resource-intensive cryptographic operations. Thus, the processor load is reduced significantly when a single "wide" SA can be used in place of multiple "narrow" security associations (as are required in conventional IKE and IPSec implementations). Furthermore, these more generic security associations are more likely to be reusable than security associations established using conventional techniques, yielding additional processing reductions. Particularly for software-based IKE and IPSec implementations, the reduced processor load is a key contributor to improving packet throughput.

The techniques disclosed herein enable providing protection for any IP packet independently in each network segment (e.g. intranet or internet) over which it travels. Permission for forwarding the packet is obtained by consulting a VPN-wide access and authorization control engine to learn whether the packet should be forwarded using security services, forwarded without using security services, or discarded. Segregating the specification of access control policy information (at an access control engine) from the security policy information (used by boundary devices for providing network layer security) allows for better control and management of the issues of access control and security. If a given user's access rights change, there is no need to change the security policy information, since generally a change in access rights does not affect network layer protection suites used to secure packets in transit. Similarly, a change in the cryptographic protection suite to be used for a VPN can be accommodated by updating a centralized security policy database, but it does not necessitate change to the access control database.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A method for providing fine-grained, identity-based access control in a computer networking environment, comprising steps of:

establishing a mutually-authenticated connection between a first end device and a second end device using strong cryptographic techniques, wherein the mutually-authenticated connection comprises a first mutually-authenticated network segment between the first end device and a boundary device providing network-layer protection and a second mutually-authenticated network segment between the second end device and the boundary device;

extracting a first authenticated identity associated with the first end device and a second authenticated identity associated with the second end device during the step of establishing the mutually-authenticated connection;

providing secure communications between a security enforcement function operating in the boundary device and an access control function;

providing the extracted first and second authenticated identities, by the security enforcement function, to the access control function;

determining access privileges of the first end device and the second end device, by the access control function, based upon the provided extracted identities;

securely communicating packet-handling directives from the access control function to the security enforcement function, based upon the determined access privileges; and using the packet-handling directives, by the security enforcement function, to determine whether to forward packets by the first end device on the first network segment to the second end device on the second network segment.

2. A computer program product for providing fine-grained, identity-based access control in a computer networking environment, the computer program product embodied on one or more computer-readable media and comprising:

computer-readable program code means for storing, for a security enforcement function operating in a network-layer boundary device, a first authenticated identity associated with a first end device with which the boundary device has established a first mutually-authenticated network-layer security association;

computer-readable program code means for storing, for the security enforcement function, a second authenticated identity associated with a second end device with which the boundary device has established a second mutually-authenticated network-layer security association; and computer-readable program code means for using the first authenticated identity and the second authenticated identity to determine whether a data packet traveling between the first end device and the second end device over the first security association and the second security association is to be forwarded or discarded upon reaching the boundary device, further comprising:

computer-readable program code means for securely sending the first authenticated identity and the second authenticated identity from the security enforcement function to an access control function, responsive to the data packet reaching the boundary device, such that the access control function can use the securely-sent identities to obtain corresponding access privileges and generate packet-handling directives based thereupon;

computer-readable program code means for securely receiving, by the security enforcement function, the packet-handling directives from the access control function; and computer-readable program code means, operable at the security enforcement function, for either forwarding or discarding the data packet, depending on the received packet-handling directives.

3. The computer program product according to claim 2, wherein the computer-readable program code means for using further comprises computer-readable program code means for examining the data packet to determine the first and second authenticated identities, responsive to the data packet reaching the boundary device and prior to operation of the computer-readable program code means for securely sending.

4. The computer program product according to claim 2, wherein the first authenticated identity is obtained for the security enforcement function from the first end device when the boundary device and the first end device establish the first security association and the second authentication identity is obtained for the security enforcement function from the second end device when the boundary device and the second end device establish the second security association.

5. The computer program product according to claim 2, wherein strong cryptographic techniques are used for security association and the second security association and are provided by protocols known as Internet Key Exchange and IP (Internet Protocol) Security Protocol.

6. The computer program product according to claim 2, wherein the computer-readable program code means for securely sending and the computer-readable program code means for securely receiving further comprise use of a secure channel established between the security enforcement function and the access control function.

7. The computer program product according to claim 2, wherein the first security association specifies only coarse-grained control information.

8. The computer program product according to claim 2, wherein the first authenticated identity associated with the first end device is an identification of a user of the first end device.

9. The computer program product according to claim 2, wherein the first authenticated identity associated with the first end device is an identification of an application executing on the first end device.

10. The computer program product according to claim 2, wherein the second security association specifies only coarse-grained access control information.

11. The computer program product according to claim 2, wherein the second authenticated identity associated with the second end device is an identification of a user of the second end device.

12. The computer program product according to claim 2, wherein the second authenticated identity associated with the second end device is an identification of an application executing on the second end device.

13. A system for providing fine-grained, identity-based access control in a computer networking environment, comprising:

means for storing, for a security enforcement function operating in a network-layer boundary device, a first authenticated identity associated with a first end device with which the boundary device has established a first mutually-authenticated network-layer security association;

means for storing, for the security enforcement function, a second authenticated identity associated with a second end device with which the boundary device has established a second mutually-authenticated network-layer security association; and means for using the first authenticated identity and the second authenticated identity to determine whether a data packet traveling between the first end device and the second end device over the first security association and the second security association is to be forwarded or discarded upon reaching the boundary device, further comprising:

means for securely sending the first authenticated identity and the second authenticated identity from the security enforcement function to an access control function, responsive to the data packet reaching the boundary device, such that the access control function can use the securely-sent identities to obtain corresponding access privileges and generate packet-handling directives based thereupon;

means for securely receiving, by the security enforcement function, the packet-handling directives from the access control function; and means, operable at the security enforcement function, for either forwarding or discarding the data packet, depending on the received packet-handing directives.

14. The system according to claim 13, wherein the means for using further comprises means for examining the data packet to determine the first and second authenticated identities, responsive to the data packet reaching the boundary device and prior to operation of the means for securely sending.

15. The system according to claim 13, wherein the first authenticated identity is obtained for the security enforcement function from the first end device when the boundary device and the first end device establish the first security association and the second authenticated identity is obtained for the security enforcement function from the second end device when the boundary device and the second end device establish the second security association.

16. The system according to claim 13, wherein strong cryptographic techniques are used for the first security association and the second security association and are provided by protocols known as Internet Key Exchange and IP (Internet Protocol) Security Protocol.

17. The system according to claim 13, wherein the means for securely sending and the means for securely receiving comprise use of a secure channel established between the security enforcement function and the access control function.

18. The system according to claim 13, wherein the security enforcement function also operates in the first end device in the second end device, and further comprising:

means for securely communicating between the security enforcement function in the first end device and the access control function to determine whether the first end device can send a particular data packet to the second end device; and means for securely communicating between the security enforcement function in the second end device and the access control function to determine whether the second end device can receive the particular data packet from the first end device.

19. The system according to claim 13, wherein the first authenticated identity associated with the first end device is an identification of a user of the first end device and/or an application executing on the first end device.

20. The system according to claim 13, wherein the second authenticated identity associated with the second end device is an identification of a user of the second end device and/or an application executing on the second end device.

21. A method for providing fine-grained, identity-based access control in a computer networking environment, comprising steps of:

storing, for a security enforcement function operating in a network-layer boundary device, a first authenticated identity associated with a first end device with which the boundary device has established a first mutually-authenticated network-layer security association;

storing, for the security enforcement function, a second authenticated identity associated with a second end device with which the boundary device has established a second mutually-authenticated network-layer security association; and using the first authenticated identity and the second authenticated identity to determine whether a data packet traveling between the first end device and the second end device over the first security association and the second security association is to be forwarded or discarded upon reaching the bounding device, further comprising steps of:

securely sending the first authenticated identity and the second authenticated identity from the security enforcement function to an access control function, responsive to the data packet reaching the boundary device, such that the access control function can use the securely-sent identities to obtain corresponding access privileges and generate packet-handling directives based thereupon;

securely receiving, by the security enforcement function, the packet-handling directives from the access control function; and either forwarding or discarding the data packet, at the security enforcement function, depending on the received packet-handling directives.

22. The method according to claim 21, wherein the using step further comprises the step of examining the data packet to determine the first and second authenticated identities, responsive to the data packet reaching the boundary device and prior to operation of the securely sending step.

23. The method according to claim 21, wherein the first authenticated identity is obtained for the security enforcement function from the first end device when the boundary device and the first end device establish the first security association and the second authenticated identity is obtained for the security enforcement function from the second end device when the boundary device and the second end device establish the second security association.

24. The method according to claim 21, wherein strong cryptographic techniques are used for the first security association and the second security association and are provided by protocols known as Internet Key Exchange and IP (Internet Protocol) Security Protocol.

25. The method according to claim 21, wherein the securely sending step and the securely receiving step further comprise use of a secure channel established between the security enforcement function and the access control function.

26. The method according to claim 21, wherein the security enforcement function also operates in the first end device and in the second end device, and further comprising the steps of;
securely communicating between the security enforcement function in the first end device and the access control function to determine whether the first end device can send a particular data packet to the second end device; and
securely communication between the security enforcement function in the second end device and the access control function to determine whether the second end device can receive the particular data packet from the first end device.

27. The method according to claim 21, wherein the first authenticated identity associated with the first end device is an identification of a user of the first end device and/or an application executing on the first end device.

28. The method according to claim 21, wherein the second authenticated identity associated with the second end device is an identification of a user of the second end device and/or an application executing on the second end device.

29. A method for providing fine-grained, identity-based access control in a computer networking environment, comprising steps of:
storing, for a first security enforcement function operating in a first network-layer boundary device, a first authenticated identity associated with a first end device with which the first boundary device has established a first mutually-authenticated network-layer security association;
storing, for a second security enforcement function operating in a second network-layer boundary device, a second authenticated identity associated with a second end device with which the second boundary device has established a second mutually-authenticated network-layer security association;
establishing a third mutually-authenticated security association between the first boundary device and the second boundary device; and
using the first authenticated identity and the second authenticated identity to determine whether a data packet traveling between the first end device and the second end device over the first security association, the third security association, and the second security association is to be forwarded or discarded upon reaching either of the boundary devices, further comprising steps of:
securely sending the first authenticated identity and the second authenticated identity from the first security enforcement function to an access control function, responsive to the data packet reaching the first boundary device, or from the second security enforcement function to the access control function, responsive to the data packet reaching the second boundary device, such that the access control function can use the securely-sent identities to obtain corresponding access privileges and generate packet-handling directives based thereupon;
securely receiving, by the first security enforcement function when the authenticated identities are sent therefrom, or by the second security enforcement function when the authenticated identities are sent therefrom, the packet-handling directives from the access control function; and
either forwarding or discarding the data packet, at the security enforcement function receiving the packet-handling directives, depending on the received packet-handling directives.

30. The method according to claim 29, wherein strong cryptographic techniques are used for the first security association and the second security association and are provided by protocols known as Internet Key Exchange and IP (Internet Protocol) Security Protocol.

31. The method according to claim 29, wherein:
the step of securely sending and the step of securely receiving each further comprise the step of using a first secure channel established between the first security enforcement function and the access control function when the data packet has reached the first boundary device or using;
a second secure channel established between the second security enforcement function and the access control function when the data packet has reached the second boundary device.

32. The method according to claim 29, wherein the first authenticated identity associated with the first end device is an identification of a user of the first end device and/or an application executing on the first end device.

33. The method according to claim 29, wherein the second authenticated identity associated with the second end device is an identification of a user of the second end device and/or an application executing on the second end device.

* * * * *

UNITED STATES PATENT AND TRADEMARK OFFICE
CERTIFICATE OF CORRECTION

PATENT NO. : 6,986,061 B1
DATED : January 10, 2006
INVENTOR(S) : Charles A. Kunzinger It is certified that error appears in the above-identified patent and that said Letters Patent is hereby corrected as shown below:

Column 15,
Line 41, insert -- sent -- between "packets" and "by".

Column 16,
Line 29, replace "authentication" with -- authenticated --.
Line 35, insert -- the first -- between "for" and "security".
Line 47, insert -- access -- between "coarse-grained" and "control".

Column 17,
Line 59, insert -- further -- before "comprise".

Column 18,
Line 36, replace "bounding" with -- boundary --.

Column 19,
Line 17, replace "communication" with -- communicating --.

Signed and Sealed this

Twenty-third Day of May, 2006

JON W. DUDAS
*Director of the United States Patent and Trademark Office*